US012739341B2

(12) United States Patent
Molholm et al.

(10) Patent No.: US 12,739,341 B2
(45) Date of Patent: Sep. 15, 2026

(54) COLLABORATIVE VIDEO RECORDING

(71) Applicant: Apple Inc., Cupertino, CA (US)

(72) Inventors: Robert K Molholm, Scotts Valley, CA (US); Michael B Johnson, Oakland, CA (US); Michael C Tchao, San Francisco, CA (US); Jeffrey A Wozniak, Los Angels, CA (US); Vincent B Laforet, Rolling Hills Estates, CA (US); Pramod M Shantharam, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 18/468,552

(22) Filed: Sep. 15, 2023

(65) Prior Publication Data

US 2024/0106975 A1 Mar. 28, 2024

Related U.S. Application Data

(60) Provisional application No. 63/376,749, filed on Sep. 22, 2022.

(51) Int. Cl.
*H04N 5/77* (2006.01)
*G11B 27/34* (2006.01)
(Continued)

(52) U.S. Cl.
CPC ............... *H04N 5/77* (2013.01); *G11B 27/34* (2013.01); *H04N 5/06* (2013.01); *H04N 5/91* (2013.01)

(58) Field of Classification Search
CPC ... H04N 5/77; H04N 5/06; H04N 5/91; G11B 27/34
See application file for complete search history.

(56) References Cited

U.S. PATENT DOCUMENTS 11,330,195 B2 * 5/2022 Griswold ............... H04N 23/90
11,343,470 B1 * 5/2022 Cronan ............... G06F 3/04842
(Continued)

FOREIGN PATENT DOCUMENTS

WO 2017079735 5/2017

OTHER PUBLICATIONS

International Search Report and Written Opinion from PCT/US2023/033187, dated Jan. 19, 2024, pp. 1-12.

*Primary Examiner* — Thai Q Tran
*Assistant Examiner* — Jose M Mesa
(74) *Attorney, Agent, or Firm* — S. Scott Foster; Kowert, Hood, Munyon, Rankin & Goetzel, P.C.

(57) ABSTRACT

A system for collaborative video recording is described. The system may include a reference clock configured to track a reference time. The system may provide, to a plurality of recording devices, a synchronization code for a collaborative video recording session. The system may identify the plurality of recording devices as participants in the collaborative video recording session. The collaborative video recording session may include broadcasting one or more synchronization signals to synchronize the plurality of recording devices to the reference time tracked by the reference clock. The collaborative video recording session may include receiving a plurality of videos from the plurality of recording devices, wherein the plurality of videos comprise timestamps based on synchronization to the reference time. The collaborative video recording session may include generating a shared timeline for the plurality of videos, wherein the shared timeline synchronizes the timestamps between the plurality of videos.

20 Claims, 7 Drawing Sheets

(51) Int. Cl.
*H04N 5/06* (2006.01)
*H04N 5/91* (2006.01)

(56) References Cited

U.S. PATENT DOCUMENTS

| | | | | |
|---|---|---|---|---|
| 11,423,945 | B1 * | 8/2022 | Seth | G11B 27/031 |
| 2010/0225811 | A1 | 9/2010 | Konvisser | |
| 2013/0278728 | A1 | 10/2013 | Gong et al. | |
| 2015/0139601 | A1 * | 5/2015 | Mate | H04N 21/41407<br>386/223 |
| 2016/0156842 | A1 | 6/2016 | Baldwin | |
| 2016/0180884 | A1 * | 6/2016 | Nowak | H04N 9/8205<br>386/201 |
| 2017/0180780 | A1 | 6/2017 | Jeffriers | |
| 2021/0337498 | A1 | 10/2021 | Lee et al. | |

* cited by examiner

600
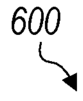

Receive, at a recording device, a synchronization code for a collaborative video recording session managed by a collaborative video system
602

Enroll the recording device in the collaborative video recording session according to the synchronization code
604

Synchronize a system clock of the recording device with a reference clock of the collaborative video system according to the synchronization code
606

During the collaborative video recording session, record one or more videos, where timestamps of the one or more videos are synchronized with the reference clock
608

During the collaborative video recording session, re-synchronize the system clock of the recording device with the reference clock in response to one or more synchronization signals received from the collaborative video system
610

Send, to the collaborative video system from the recording device, the one or more recorded videos
612

FIG. 6

COLLABORATIVE VIDEO RECORDING

RELATED APPLICATIONS

This application claims benefit of priority to U.S. Provisional Application Ser. No. 63/376,749, entitled "COLLABORATIVE VIDEO RECORDING," filed Sep. 22, 2022, and which is incorporated herein by reference in its entirety.

BACKGROUND

Large events and gatherings tend to have numerous attendees recording videos throughout the event. Each of the attendees may store and share some of the videos with individual friends or social media posts. Event hosts may ask the attendees to send their videos in to be collected for subsequent organization or viewing. The event hosts may attempt to determine relative timing of each video based on metadata associated with respective videos.

The different videos provided by different attendees may indicate timestamps. However, each of the timestamps would be based on different system clocks for different mobile computing devices. Different system clocks may be subject to different clock skews such that the respective timestamps on the different videos may not necessarily be aligned. Thus, a specific point in time may be represented by different timestamps on different videos.

SUMMARY

Various systems and methods for synchronizing devices in a collaborative video recording session are described herein. A base station computer may be configured as a collaborative video recording system to manage the collaborative video recording session between the devices. The collaborative video recording system may include a reference clock that may be a reference clock for the devices. The devices may be synchronized to the reference clock such that videos recorded by a device are temporally synchronized to other devices that are also synchronized to the reference clock. The collaborative video recording system may be configured to provide information that may configure the devices to participate in the collaborative video recording session. The collaborative video recording system may provide a synchronization code to the devices. For example, the synchronization code may be presented on a display device connected to the collaborative video recording system.

The devices may detect the synchronization code through any capable input device coupled to the devices. The devices may capture an image of the synchronization code via the camera. The devices may process the image with one or more processors to analyze the synchronization code to extract data from the captured image. For example, the devices may interpret the synchronization code to determine a current time of the reference clock. The synchronization code may also include other information that indicates the collaborative video recording session. The devices may enroll in the collaborative video recording session according to information encoded in the synchronization code.

The devices may include an image capture device, such as a camera, configured to record videos. The devices may include a system clock configured to maintain a current system time. While recording a video, the current system time may be stored as metadata with the video indicating that a particular point in time of the video coincides with a particular point in time of the system clock that has been synchronized with the reference clock. For example, the metadata may indicate that recording of the video was initiated at a specific point in time. The specific point in time may be expressed in a format that includes the current date and time, such as ISO 8601 format or Unix time.

During or after the collaborative video recording session, the devices may send the recorded videos to the collaborative video recording system. The collaborative video recording system may generate a shared timeline that includes references to each of the recorded videos. The shared timeline may indicate which videos have data for different points in time. A client may select a particular point in time and retrieve any or all of the videos that have data for that particular point in time.

In one aspect, a system for managing a collaborative video recording session is described. The system may include a reference clock configured to track a reference time. The system may also include one or more processors and a memory storing instructions that, when executed on or across the one or more processors, cause the one or more processors to implement a collaborative video system. The collaborative video system may provide, to a plurality of recording devices, a synchronization code for a collaborative video recording session. The collaborative video system may, based on proving the synchronization code to the plurality of recording devices, identify the plurality of recording devices as participants in the collaborative video recording session. The collaborative video system may coordinate execution of the collaborative video recording session. The collaborative video recording session may include broadcasting one or more synchronization signals to synchronize the plurality of recording devices to the reference time tracked by the reference clock. The collaborative video recording session may include receiving a plurality of videos from the plurality of recording devices, wherein the plurality of videos comprise timestamps based on synchronization to the reference time. The collaborative video recording session may include generating a shared timeline for the plurality of videos, wherein the shared timeline synchronizes the timestamps between the plurality of videos.

In another aspect, a method for managing a collaborative video recording session is described. The method may include providing, from a collaborative video system to a plurality of recording devices, a synchronization code for a collaborative video recording session managed by the collaborative video system. The method may also include based on providing the synchronization code to the plurality of mobile devices, identifying the plurality of mobile devices as participants in the collaborative video recording session. The method may further include coordinating execution of the collaborative video recording session. The collaborative video recording session synchronizing the plurality of recording devices to a reference time tracked by a reference clock. The collaborative video recording session may also include receiving a plurality of videos from the plurality of recording devices, wherein the plurality of videos comprise timestamps based on synchronization to the reference time. The collaborative video recording session may further include generating a shared timeline for the plurality of videos, wherein the shared timeline synchronizes the timestamps between the plurality of videos.

In yet another aspect, one or more computer-readable storage media for managing a collaborative video recording session are described. The one or more computer-readable storage media may store instructions that, when executed on or across one or more processors, cause the one or more processors to perform operations. The operations may include generating a synchronization code for a collaborative video recording session based on a reference clock to be synchronized to a plurality of recording devices. The operations may include providing, to the plurality of recording devices, the synchronization code. The operations may include based on providing the synchronization code to the plurality of mobile devices, identifying the plurality of recording devices as participants in the collaborative video recording session. The operations may include coordinating execution of the collaborative video recording session. The collaborative video recording session may include synchronizing the plurality of recording devices to a reference time tracked by a reference clock. The collaborative video recording session may include in response to receipt of a plurality of videos from the plurality of recording devices, generating a shared timeline for the plurality of videos, wherein the plurality of videos comprise timestamps based on synchronization to the reference time, and wherein the shared timeline synchronizes the timestamps between the plurality of videos.

BRIEF DESCRIPTION OF THE DRAWINGS

FIG. 6 is a flowchart diagram for a method for a recording device participating in a collaborative video recording session, according to some embodiments.

Figure 1:
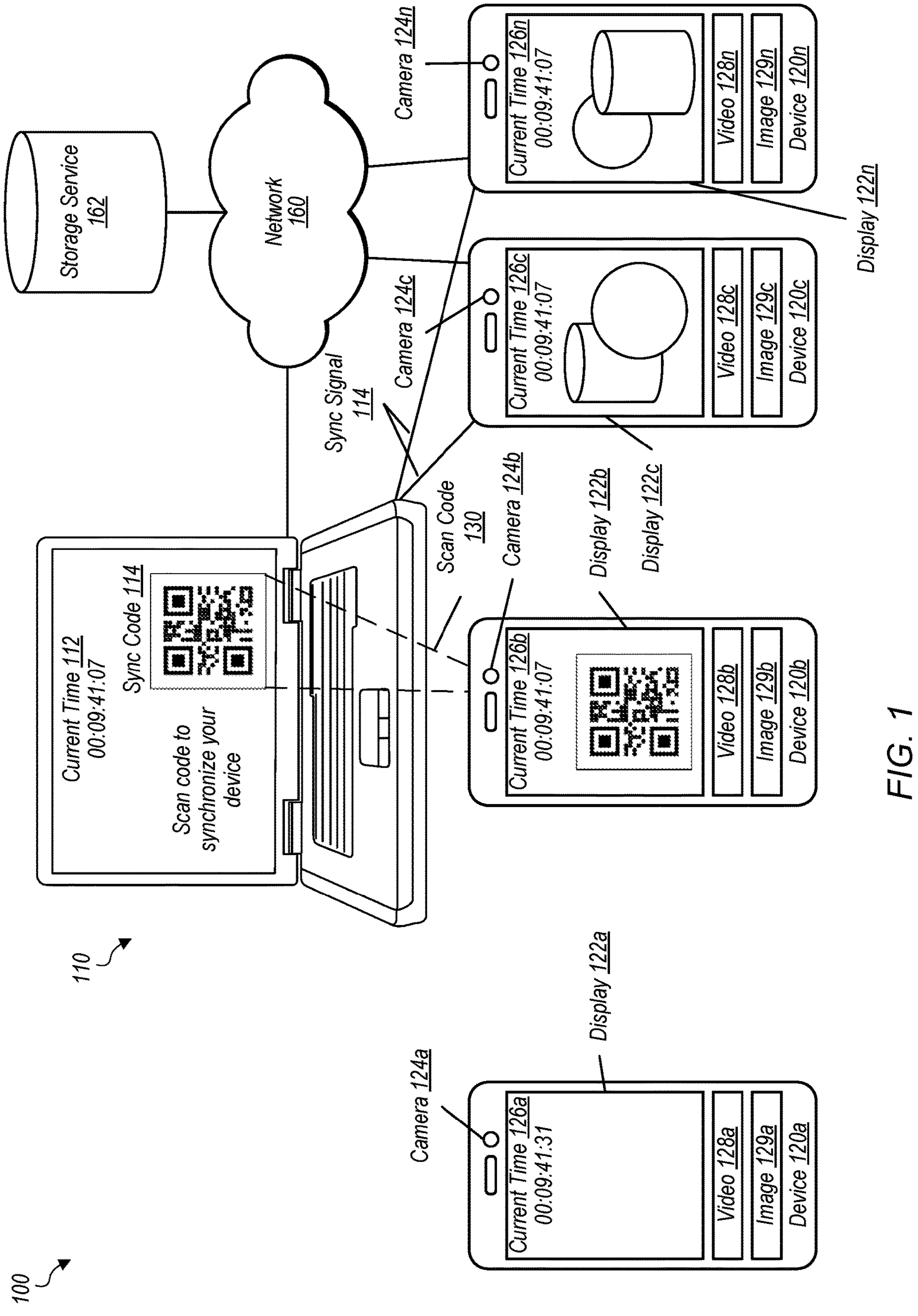
FIG. 1 illustrates a system diagram for a system for collaborative video recording, according to some embodiments.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION

FIG. 1 illustrates a system diagram for a system 100 for collaborative video recording. The system 100 may include a collaborative video recording system 110 and a plurality of recording devices, such as mobile computing devices 120*a* . . . *n*, according to some embodiments. The collaborative video recording system 110 may coordinate execution of a collaborative video recording session, according to various embodiments. The collaborative video recording system 110 may include one or more hardware components that collectively form a computing device, according to some embodiments. Individual ones of the plurality of mobile computing devices 120*a* . . . *n* may include one or more hardware components, according to some embodiments.

The mobile computing devices 120 may respectively include a display 122, a camera 124, and a device clock 126, according to some embodiments. The mobile computing devices 120 may use the camera 124 to capture images, such as a video 128 or an image 129. The camera 124 may include or be coupled to a microphone to capture audio to be included as part of the video 128. In some embodiments, the collaborative video recording system 110 may also coordinate video recordings from other recording devices. For example, the collaborative video recording system 110 may also receive and manage timestamps for desktop computing devices, laptop computing devices, standalone camera devices, networked cameras, etc. In some implementations, mobile computing devices 120 may include one or more of these types of devices for recording videos to be synchronized with the collaborative video recording system 110.

The collaborative video recording system 110 may include a reference clock 112 configured to track a reference time. The reference clock 112 may be synchronized to other devices that are participating in the collaborative video recording session. In some embodiments, the reference clock 112 may be expressed in a format that includes the current date and time, such as ISO 8601 format or Unix time. For example, the reference clock 112 may represent a time of 00:09:41:07 and synchronize the time to the other devices. The reference clock 112 may be set by the collaborative video recording system 110 for use across the devices capturing videos. The reference clock 112 may serve as a synchronized time base to which the mobile computing devices 120 are synchronized. In some situations, individual ones of the mobile computing devices 120 have a level of manufacturing tolerance that may cause the devices 120 to drift over time if running independently. In some embodiments, the collaborative video recording system 110 may repeatedly reset the device clocks 126 in response to each tick of the reference clock 112. For example, the devices 120 may share the same time base according to the reference clock 112. The collaborative video recording system 110 may distribute the reference time stamp on the time base. In some situations, a repeating impulse produces a cadence, and the timestamp of the reference clock 112 fits into an established cycle.

A recording device, such as mobile computing device 120*a*, may be initially unregistered or unenrolled with the collaborative video recording system 110. The mobile computing device 120*a* may have one or more components configured to implement the device clock 126*a* to track a device time for the mobile computing device 120*a*. In some situations, the device clock 126*a* may initially be unsynchronized with the reference clock 126. As an illustrative example, the device time indicated by the device clock 126*a* may be 00:09:41:31, while the reference time of the reference clock is 00:09:41:07. The mobile computing devices 120 may be enrolled with the collaborative video recording system 110 to be synchronized to the reference clock 112.

A mobile computing device 120*b* initiate a synchronization operation with the collaborative video recording system 110 to synchronize the mobile computing device 120*b* with the reference clock 112, according to some embodiments. The mobile computing device 120*b* may obtain information from the collaborative video recording system 110 as part of the synchronization operation. In some embodiments, the camera 124*b* of the mobile computing device 120*b* may capture an image of identifying information from the collaborative video recording system 110. For example, the camera **124*b* may capture a synchronization code 114 that is associated with the collaborative video recording system 110. In some implementations, the synchronization code 114 may be displayed on a display device of the collaborative video recording system 110. In other implementations, the synchronization code 114 may be displayed on an offline item, such as a printout, a poster, or a sign. In some embodiments, the synchronization code 114 may be used as part of an opt-in system such that only mobile computing devices 120** from users who voluntarily wish to be included in the collaborative video recording session may be included.

The synchronization code 114 may include identifying information for the collaborative video recording system 110, according to some embodiments. For example, the synchronization code 114 may include a system identifier for the collaborative video recording system 110. As another example, the synchronization code 114 may include an indication of the reference time to which the mobile computing devices 120 are to be synchronized. As yet another example, the synchronization code 114 may include additional security information that the mobile computing devices 120 may use to indicate that the videos 128 and the images 129 are authorized to be included as part of a collaborative video session. In some embodiments, the synchronization code 114 may include destination information for the videos 128 and the images 129. For example, the mobile computing devices 120 may send the videos to a video storage destination according to the destination information.

The mobile computing device **120*b* may obtain the synchronization code 114 and modify the device clock 126*b* to be synchronized with the reference clock 112, according to some embodiments. For example, the device clock 126*b* may be synchronized with the reference clock 112 such that both the device clock 126*b* and the reference clock 112 indicate a current time of 00:09:41:07. The display 122*b* may display a confirmation that the mobile computing device 120*b* is synchronized with the collaborative video recording system 110. After synchronization, the mobile computing device 120*b* may record one or more videos 128*b* that include timestamps that have been synchronized to the reference clock 112. The mobile computing device 120*b* may capture one or more images 129*b* that include a timestamp that has been synchronized to the reference clock 112. In some embodiments, frames of the one or more videos 128 captured by the mobile computing devices 120 may be synchronized based at least in part on the reference clock. For example, a particular frame may be captured in response to a tick of the device clock 126. The timestamps associated with frames of the videos 128*b* or the images 129*b* may facilitate synchronization between individual frames captured by different ones of the mobile computing devices 120. In some embodiments, an impulse may cause frames of the one or more videos 128** to be captured. For example, the clock tick or the timestamp may trigger the impulse.

Enrolled mobile computing devices of the mobile computing devices 120 may record videos 128 of portions of the collaborative video recording event from various perspectives or viewing angles, according to some embodiments. As an illustrative example, the enrolled mobile computing devices may include at least a mobile computing device **120*c* and a mobile computing device 120*n*. The mobile computing device 120*c* may include a camera 124*c* configured to capture a video 128*c* of a scene or an environment. The video 128*c* may be displayed via display 122*b* of the mobile computing device 120*c*, according to various embodiments. The mobile computing device 120*n* may include a camera 124*n* configured to capture a video 128*n* of the scene or the environment from a different perspective than the mobile computing device 120*c*. The video 128*n* may be displayed via display 122*n* of the mobile computing device 120*n***, according to various embodiments.

The collaborative video recording system 110 may send a synchronization signal 116 enrolled mobile computing devices, such as the mobile computing devices **120*b*, 120*c*, and 120*n*. In some embodiments, the collaborative video recording system 110 may periodically or repeatedly send the synchronization signal 116 to the enrolled mobile computing devices to provide a current reference time to ensure that individual frames from the devices are perceived to be captured at the same moment in time. The repeatedly provided current reference time may cause the enrolled mobile computing devices to maintain synchronization with the reference clock 112 in situations when a device clock 126 has a clock skew that would cause the device clock 126 to increment time at a different rate than the collaborative video recording system 110**.

The collaborative video recording system 110 be connected to a network 160, according to some embodiments. For example, the network 160 may include one or more of a local area network or a wide area network accessible by various computing devices. As another example, the network 160 may include a mobile network or a cellular network accessible by the various computing devices. The mobile computing devices 120 may send one or more of the videos 128 to the collaborative video recording system 110 via the network 160, according to some embodiments. For example, the mobile computing device **120*c* may send the video 128*c* to the collaborative video recording system 110 via the network 160. The collaborative video recording system 110** may determine whether a particular video provided by a particular mobile computing device is authorized to be included as part of the collaborative video recording session.

A storage service 162 may store at least one of the videos 128 on behalf of the collaborative video recording system 110 or the mobile computing devices 120, according to some embodiments. The storage service 162 may be indicated as part of the destination information included in the synchronization cod 114. For example, the collaborative video recording system 110 may delegate storage of the videos 128 to the storage service 162. In some embodiments, the storage service 162 may include a cloud-based storage service. In other embodiments, the storage service 162 may include a network accessible storage device. The mobile computing devices 120 may send the videos 128 to the collaborative video recording system 110 and/or the storage service 162 during or after the collaborative video recording session.

The storage service 162 may authorize the mobile computing devices 120 based on enrollment in the collaborative video recording session, according to some embodiments. For example, the collaborative video recording system 110 may provide authentication information to the storage service 162 to be verified against authentication information provided by the mobile computing devices 120. For example, the mobile computing device **120*a* may be restricted from uploading the video 128*a* to the collaborative video recording system 110 or the storage service 162 as part of the collaborative video recording session. As another example, the mobile computing devices 120*b*, 120*c*, or 120*n* may be authorized to upload the videos 128*b*, 128*c***, and

128*n* to the collaborative video recording system 110 or the storage service 162 based on authentication by the collaborative video recording system 110 or the storage service 162. In some embodiments, the mobile computing devices 120 may communicate with a peer-to-peer communications protocol between the mobile computing devices 120, the collaborative video recording system 110 or the storage service 162.

Individual ones of the mobile computing devices 120 may communicate with the collaborative video recording system 110 or the storage service 162 without communicating with other ones of the mobile computing devices 120, according to various embodiments. For example, the mobile computing device 120*c* may upload the video 128*c* to the storage service 162 without having to communicate with the mobile computing device 120*n*. In some implementations, individual ones of the mobile computing devices 120 may be unaware that other ones of the mobile computing devices 120 are also participating in the collaborative video recording session. In other implementations, the mobile computing devices 120 may have access to a version of the shared timeline that includes at least a portion of videos 128 that have been provided by the mobile computing devices 120.

Figure 2:
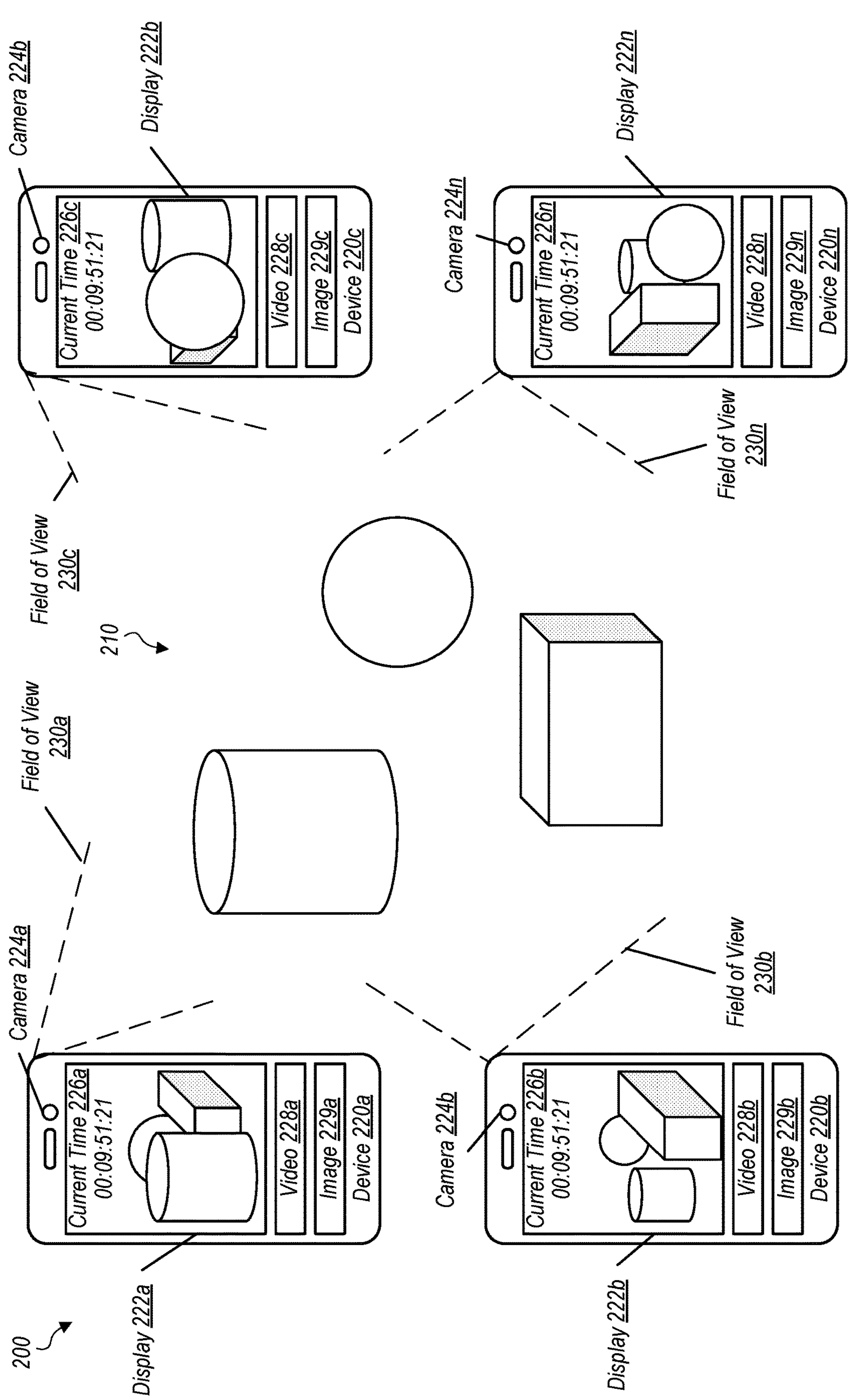
FIG. 2 is an example diagram of a plurality of recording devices capturing videos of a scene, according to some embodiments.

FIG. 2 is an example diagram of a plurality of mobile computing devices 220 capturing videos 228 of a scene 210, according to some embodiments. The mobile computing devices 220 may respectively include a display 222, a camera 224, and a device clock 226, according to various embodiments. The scene 210 may include various objects 212, 214, and 216. The mobile computing devices 220 may each be enrolled with a collaborative video system, such as the collaborative video recording system 110 of FIG. 1.

The mobile computing devices 220 may be synchronized to a reference clock of the collaborative video system. The mobile computing devices 220 may record videos 228 or capture images 229 that include timestamps that are synchronized to the reference clock, according to some embodiments. For example, the videos 228 and the images 229 may include metadata that indicates that a given timestamp corresponds to a respective point in time relative to the reference clock. As another example, the device clocks 226*a*, 226*b*, 226*c*, and 226*n* are synchronized to the reference clock and are set to the same time.

The cameras 224 may have respective fields of view 230 of the scene 210. For example, the camera 224*a* of the mobile computing device 220*a* has field of view 230*a* of the scene 210. The display 222*a* of the mobile computing device 220*a* may include an image of the scene 210 as viewed according to the field of view 230*a*. As another example, individual ones of the mobile computing devices 220 may have respective displays 222 of the fields of view 230 of the scene 210.

The videos 228 may have different views of the scene 210 based on the mobile computing devices 220 being in different locations at a given point in time. In some embodiments, the mobile computing devices 220 may send the videos 228 to the collaborative video recording system or a storage service based on destination information provided by the collaborative video system.

Figure 3:
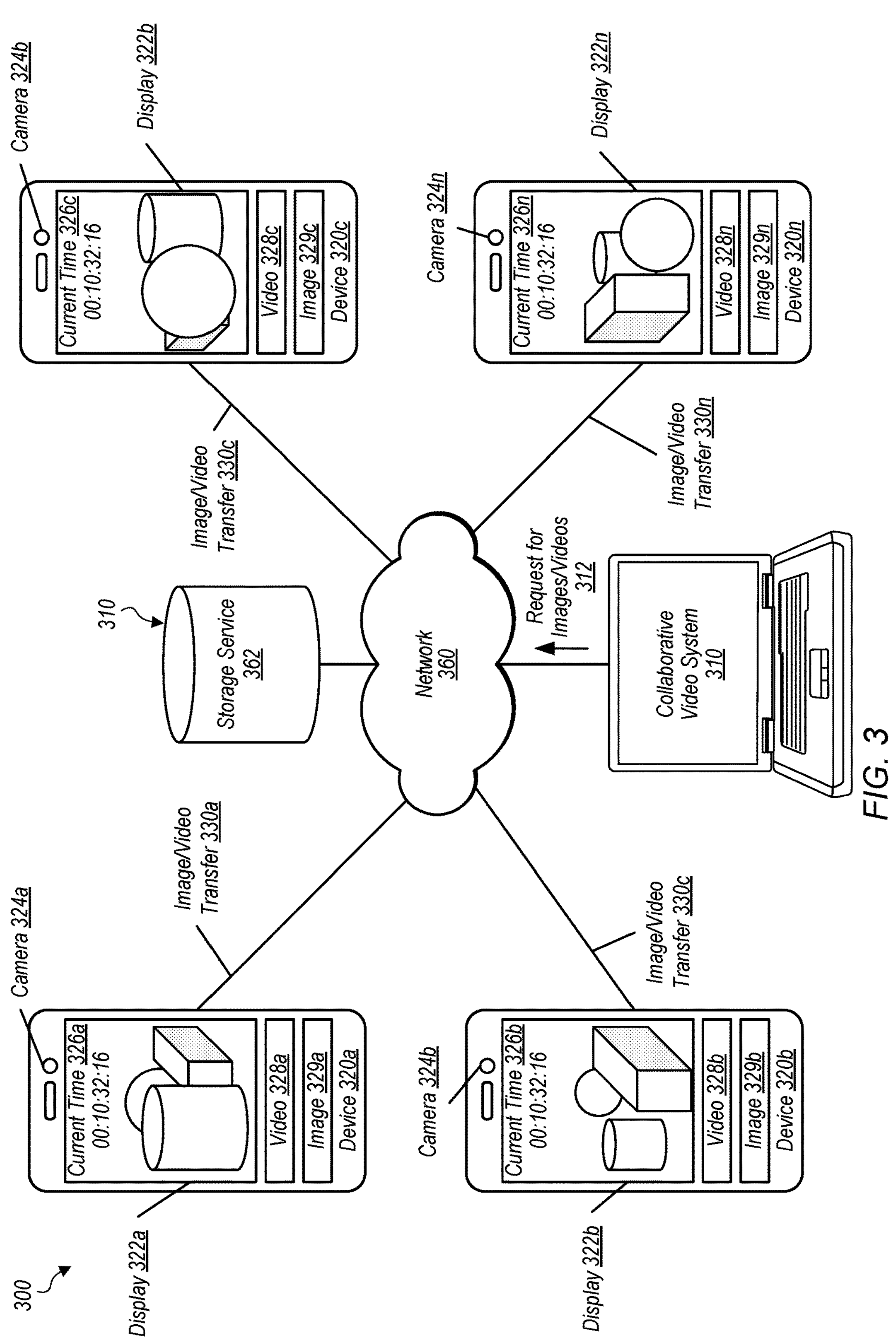
FIG. 3 is an example diagram of a plurality of recording devices communicating with the collaborative video system, according to some embodiments.

FIG. 3 is an example diagram of a system 300 for transmitting recorded images and videos from a plurality of mobile devices 320 to a storage destination of a collaborative video system 310, according to some embodiments. The collaborative video system 310 may coordinate execution of a collaborative video recording session, according to various embodiments. The collaborative video system 310 may be coupled to a storage service 362 via a network 360, according to some embodiments. The mobile computing devices 320 may respectively include a display 322, a camera 324, and a device clock 326, according to various embodiments. The mobile computing devices 320 may each be enrolled with the collaborative video system 310.

The mobile computing devices 220 may be synchronized to a reference clock of the collaborative video system. The mobile computing devices 220 may record videos 228 or capture images 229 that include timestamps that are synchronized to the reference clock, according to some embodiments. For example, the videos 228 and the images 229 may include metadata that indicates that a given timestamp corresponds to a respective point in time relative to the reference clock. As another example, the device clocks 226*a*, 226*b*, 226*c*, and 226*n* are synchronized to the reference clock and are set to the same time.

The mobile computing devices 320 may send one or more of the videos 328 or the images 329 to a destination as part of an image or video transfer 330 during or after a collaborative video recording session, according to some embodiments. In some implementations, the destination of the image or video transfer 330 may be the collaborative video system 110. In other implementations, the destination of the image or video transfer 330 may be the storage service 362. The collaborative video system 310 may indicate the destination to the mobile computing devices 320 via a synchronization code or a synchronization signal sent to the mobile computing devices 320, in various embodiments.

After conclusion of the collaborative video session, the collaborative video system 310 may send a request for images and videos 312 to the mobile computing devices 320, according to some embodiments. For example, the collaborative video system 310 may inform the mobile computing devices 320 that the collaborative video session has concluded and that any unsent videos 328 or images 329 may be sent to the collaborative vide system 310.

Figure 4:
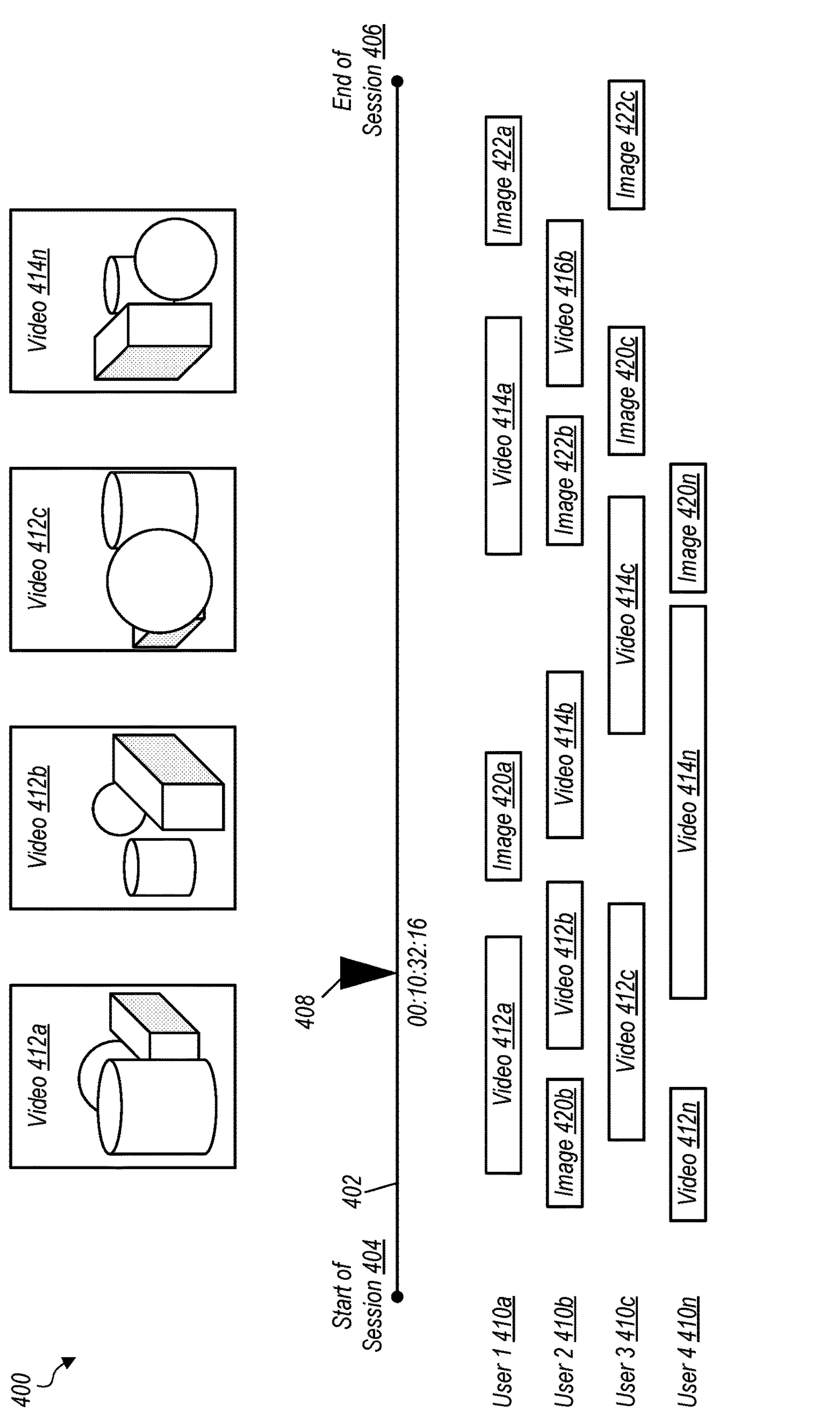
FIG. 4 illustrates an interface for a shared timeline that includes multiple videos received from multiple users, according to some embodiments.

FIG. 4 is a diagram illustrating an interface 400 that includes a timeline 402 of different videos of a collaborative video recording session, according to some embodiments. The interface 400 may be generated by a collaborative video system, such as the collaborative video recording system 110 of FIG. 1, according to some embodiments. The videos may be recorded by different mobile computing devices, such as the mobile computing devices 120 of FIG. 1 or the mobile computing devices 220 of FIG. 2, according to some embodiments.

The timeline 402 may indicate a start of a collaborative video recording session 404 and an end of the collaborative video recording session 406, according to some embodiments. The timeline 402 may include user interface (UI) elements to select a point in time to obtain videos that have video data for the selected point in time, according to some embodiments. For example, the timeline 402 may include a selection indicator 408 that may select the point in time. In some implementations, a user may move the selection indicator 408 along the timeline to obtain videos for the selected point in time. In other implementations, the user may enter in the point in time as a text entry. In yet other implementations, the user may enter the point in time with interactive elements such as scrolling wheel menus or drop down menus configured to receive time entries.

The interface 400 may include videos received from different users associated with different mobile computing devices, according to some embodiments. For example, a first user 410*a* may provide videos 412*a* and 414*a*, a second user 410*b* may provide videos 412*b*, 414*b* and 416*b*, a third user 410*c* may provide videos 412*c* and 414*c*, and an Nth user may provide videos 410*n* and 414*n*. A quantity of users 410 or videos may vary depending on different implementations.

The interface 400 may also include images received from the different users associated with the different mobile computing devices, according to some embodiments. For example, the first user 410*a* may provide image 420*a*, the second user 410*b* may provide image 420*b*, the third user may provide images 420*b* and 422*c*, and the Nth user may provide image 420*n*. The quantity of images may vary depending on different implementations.

Based on selection of a point in time with the selection indicator 408, the interface 400 may provide the videos that include video data for the point in time, according to some embodiments. As an illustrative example, the selection indicator 408 may be set to time 00:09:41:07. In some embodiments, an arrangement of UI elements for the videos may indicate ranges of time in which video data is present in the respective videos. Videos that include video data for the selected point in time may appear below the selection indicator 408 in the interface 400. In this example, videos 412*a*, 412*b*, 412*c* and 414*n* include video data at 00:09:41:07.

The interface 400 may include views of the videos 412*a*, 412*b*, 412*c* and 414*n*, according to some embodiments. The interface 400 may also include video playback controls to view one or more of the videos. For example, the videos 412*a*, 412*b*, 412*c* and 414*n* may be viewed synchronously to show different camera angles of a scene. As another example, an individual video, such as the video 412*a*, may be viewed individually while the other videos, such as the videos 412*b*, 412*c* and 414*n* remain stopped or unplayed. In some implementations, playback along the timeline 402 may show and hide different videos based on whether the videos have video data for a current point in time along the timeline 402. For example, based on a video reaching an end of its video data or not containing video data for another point in time, the video may be hidden. As another example, based on a video having video data for a given point in time, the video may be presented during playback of the timeline 402. In some situations, the videos and images may have different resolutions and quality settings. The interface 400 may provide one or more options to normalize or resample the videos and images such that an output video stream may be unified in resolution.

Figure 5:
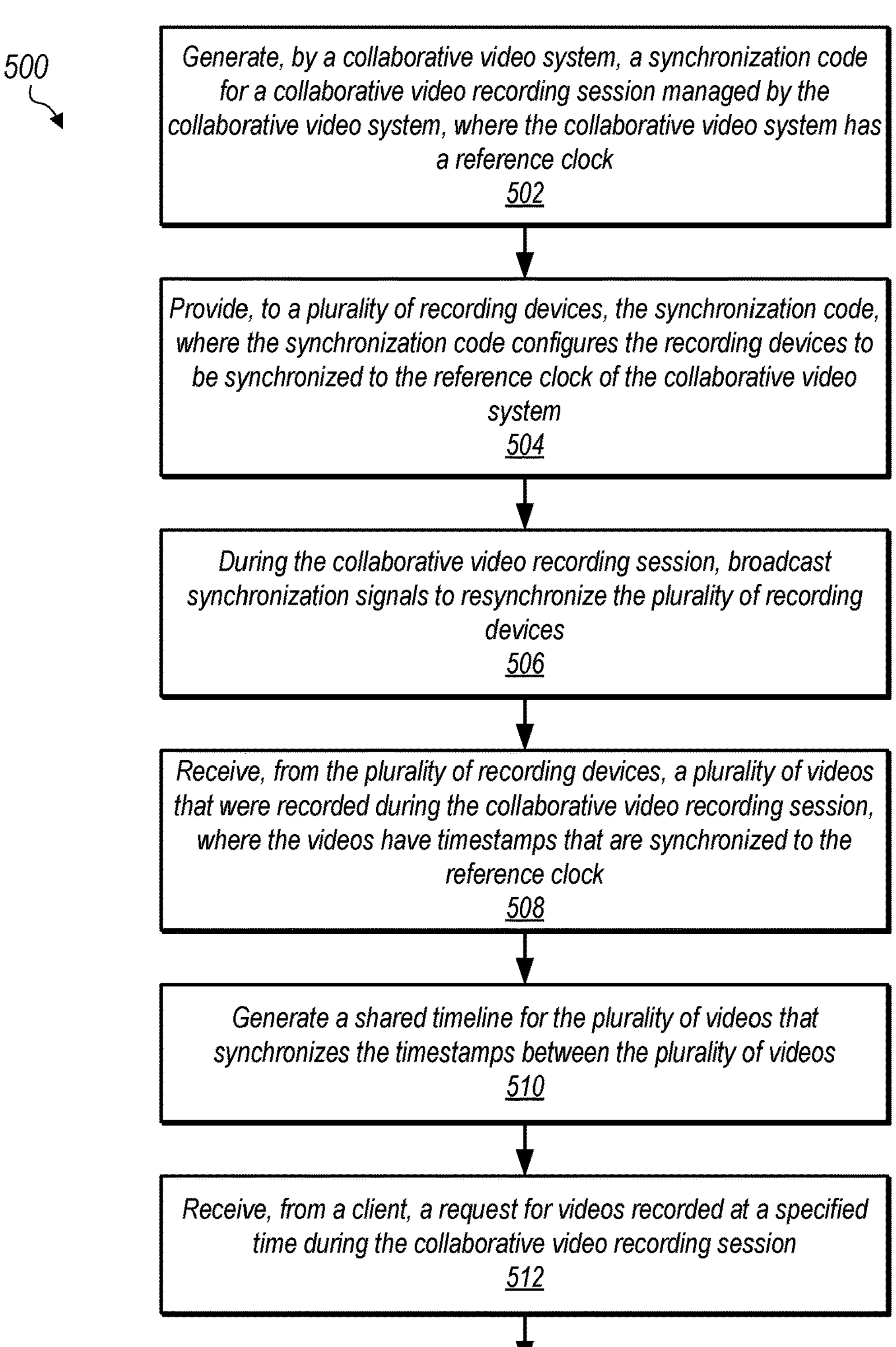
FIG. 5 is a flowchart diagram for a method for generating a shared timeline by a collaborative video system, according to some embodiments.

FIG. 5 is a flowchart diagram for a method 500 for generating a shared timeline by a collaborative video system, according to some embodiments. The method 500 may be performed by a collaborative video system, such as the collaborative video recording system 110 of FIG. 1, according to some embodiments.

The method 500 may include generating, by a collaborative video system, a synchronization code for a collaborative video recording session managed by the collaborative video system, where the collaborative video system has a reference clock configured to track a reference time, at 502. The synchronization code may include information identifying the collaborative video system, according to some embodiments. In some embodiments, the synchronization code may include security information to authorize mobile computing devices to access portions of the collaborative video system. The synchronization code may include an indication of a current reference time of the reference clock.

The method 500 may include providing, to a plurality of mobile computing devices, the synchronization code, where the synchronization code configures the mobile computing devices to be synchronized to the reference clock of the collaborative video system, at 504. In some embodiments, the collaborative video system may provide the synchronization code via a display device coupled to the collaborative video system. In other embodiments, the collaborative video system may provide the synchronization code to an output device configured to affix the synchronization code to a tangible medium. For example, the collaborative video system may provide the synchronization code to a printer to print the synchronization code on paper. In other embodiments, the collaborative video system may send the synchronization code via a wireless communications protocol. For example, the collaborative video system may send the synchronization code via a network connection or a peer-to-peer connection to the mobile computing devices.

The method 500 may also include during the collaborative video recording session, broadcasting synchronization signals to resynchronize the plurality of mobile computing devices, at 506. In some embodiments, the collaborative video system may periodically or repeatedly broadcast the synchronization signals to ensure that the mobile computing devices are synchronized to the reference clock. For example, a mobile computing device may receive a synchronization signal and verify that the device clock of the mobile computing device is synchronized. In some embodiments, the collaborative video system may broadcast the synchronization signals via beacon signal. In other embodiments, the collaborative video system may broadcast the synchronization signals via a heartbeat communication via a network connection to the mobile computing devices.

The method 500 may further include receiving, from the plurality of mobile computing devices, a plurality of videos that were recorded during the collaborative video recording session, where the videos have timestamps that are synchronized to the reference clock, at 508. In some embodiments, the mobile computing devices may send the videos to the collaborative video system during or after the collaborative video recording session. For example, a given mobile computing device may upload videos to the collaborative video system as soon as the videos are recorded while the collaborative video recording session is ongoing. As another example, the given mobile computing device may wait to send the videos until after the collaborative video recording session has concluded when the given mobile computing device satisfies a network condition (e.g., connected to a Wi-Fi network). Different videos may be received from different mobile computing devices over a period of time.

The method 500 may also include generating a shared timeline for the plurality of videos that synchronizes the timestamps between the plurality of videos, at 510. In some embodiments, the shared timeline may indicate which videos of the plurality of videos have content at a specific point of time relative to the reference clock. In some implementations, the specific point in time may be expressed as an absolute time value. In other implementations, the specific point in time may be expressed as a relative time value that is relative to the start of the collaborative video recording session.

The method 500 may further include receiving, from a client, a request for videos recorded at a specified time during the collaborative video recording session, at 512. The client may send the request as part of a video management session, according to some embodiments. The request may include an indication of the specified time. In some embodiments, the request may be received on a timeline interface. In other embodiments, the request may be received as a text input for the specified time. The collaborative video system may identify the subset of videos based on the specified time, according to some embodiments. For example, the collaborative video system may identify videos that have recorded content at the specified time. The synchronized timestamps may indicate that a portion of a given video is recorded at the specified time. For example, a given video may include metadata that indicates a range of times during which video data was recorded.

The method 500 may also include providing, to the client, a subset of the plurality of videos that were recorded at the specified time based on a corresponding timestamp for the specified time, at 514. The collaborative video system may provide indications of the subset through a user interface that provides access to the videos for viewing by the client, according to some embodiments. In some embodiments, the collaborative video system may send the subset of videos to the client.

FIG. 6 is a flowchart diagram for a method 600 for a mobile computing device participating in a collaborative video recording session, according to some embodiments. The mobile computing device may be one of the mobile computing devices 120 of FIG. 1 or one of the mobile computing devices 220 of FIG. 2, according to some embodiments. The collaborative video recording session may be managed by a collaborative video system, such as the collaborative video recording system 110 of FIG. 1, according to some embodiments.

The method 600 may include receiving, at a mobile computing device, a synchronization code for a collaborative video recording session managed by a collaborative video system, at 602. In some embodiments, the mobile computing device may include an image capture device configured to capture image data and video data of an environment. For example, the mobile computing device may include a camera. In some embodiments, the synchronization code may be embedded in a graphical representation or an image. For example, the synchronization code may be included as part of a QR code. In some embodiments, the camera of the mobile computing device may capture an image of the QR code to obtain the synchronization code from the collaborative video system. In other embodiments, the collaborative video system may provide the synchronization code via a network communication between the collaborative system and the mobile computing device. The mobile computing device may interpret and apply the synchronization code after receiving the synchronization code.

The method 600 may also include enrolling the mobile computing device in the collaborative video recording session according to the synchronization code, at 604. In some embodiments, the mobile computing device may send an enrollment request to the collaborative video system. For example, the mobile computing device may generate the enrollment request based on at least a portion of the synchronization code. The collaborative video system may enroll the mobile computing device in response to the enrollment request.

The method 600 may further include synchronizing a device clock of the mobile computing device with a reference clock of the collaborative video system according to the synchronization code, at 606. In some embodiments, the mobile computing device may modify the device clock based on a reference time tracked by the reference clock. For example, the synchronization code may indicate a current time of the reference clock. As another example, the synchronization code may provide access to the current time of the reference clock such that the mobile computing device may access the reference clock to determine the current time to set the device clock.

The method 600 may also include during the collaborative video recording session, recording one or more videos, where timestamps of the one or more videos are synchronized with the reference clock, at 608. The mobile computing device may include a camera configured to capture image data and video data, according to some embodiments. The mobile computing device may include metadata with the image data or the video data that may indicate a current time according to the device clock that is synchronized with the reference clock.

The method 600 may further include during the collaborative video recording session, re-synchronizing the device clock of the mobile computing device with the reference clock in response to one or more synchronization signals received from the collaborative video system, at 610. In some embodiments, the collaborative video system may periodically or repeatedly send synchronization signals to resynchronize mobile computing devices to the reference clock. The mobile computing device may receive the synchronization signals and resynchronize the device clock with the reference clock. In some implementations, the mobile computing device may have an inherent clock skew in the device clock that may need correction to maintain time with the reference clock.

The method 600 may conclude by sending, to the collaborative video system from the mobile computing device, the one or more recorded videos, at 612. The mobile computing device may send the recorded videos during or after the collaborative video recording session. In some embodiments, the mobile computing device may send the recorded videos through a network connection to the collaborative video system. In other embodiments, the mobile computing device may send the recorded videos to a storage service provisioned for the collaborative video system.

Figure 7:
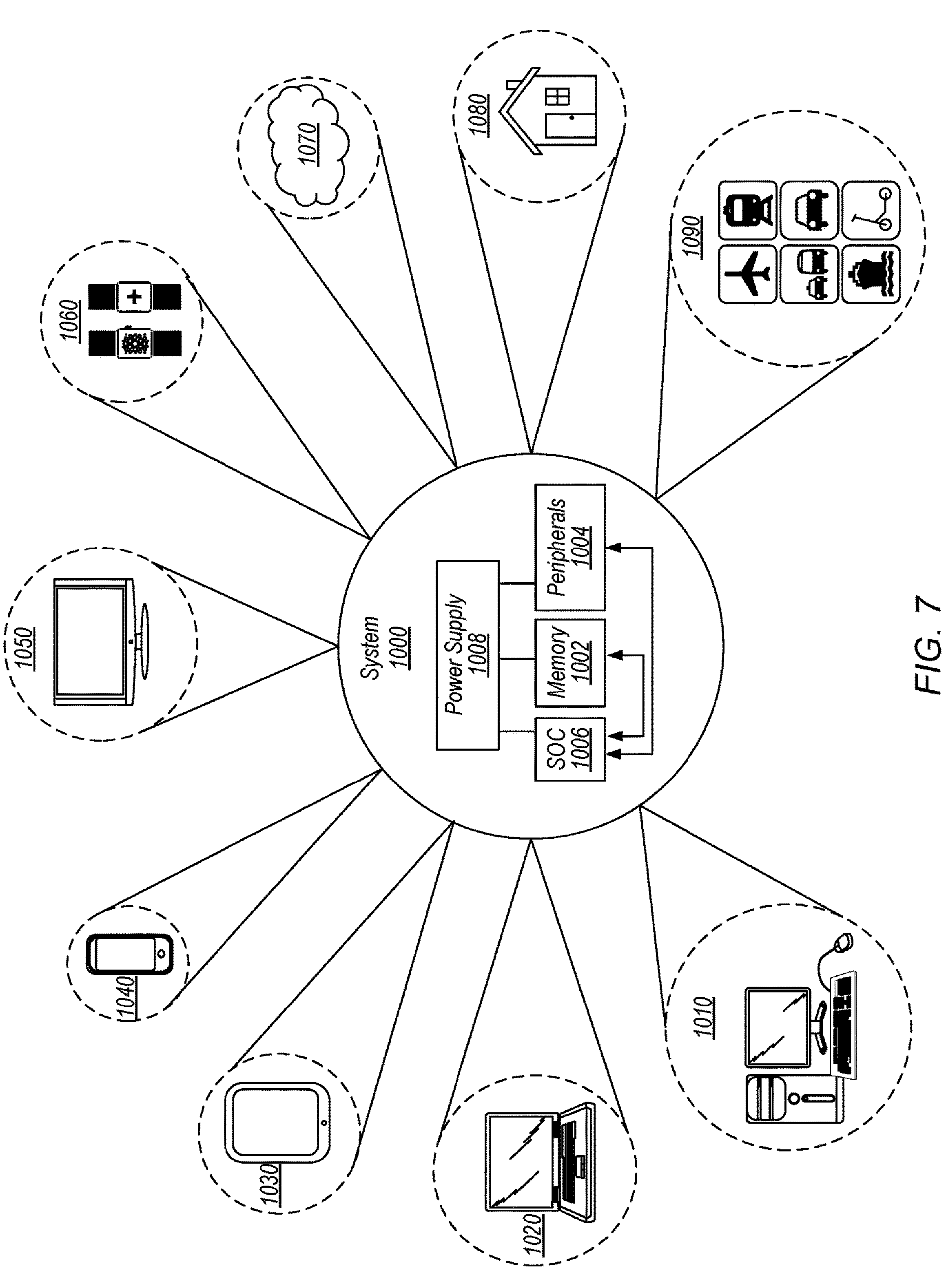
FIG. 7 is a block diagram of various embodiments of computer systems that may include collaborative video recording.

FIGS. 1-9 illustrate circuits and methods for a system, such as an integrated circuit, that includes a return prediction circuit and/or a sequential prediction circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. Computer system 700 may, in some embodiments, include any disclosed embodiment of system 100, 200 or 300.

In the illustrated embodiment, the system 700 includes at least one instance of a system on chip (SoC) 706 which may include multiple types of processor circuits, such as a central processing unit (CPU), a graphics processing unit (GPU), or otherwise, a communication fabric, and interfaces to memories and input/output devices. One or more of these processor circuits may correspond to an instance of the systems disclosed herein. In various embodiments, SoC 706 is coupled to external memory circuit 702, peripherals 704, and power supply 708.

A power supply 708 is also provided which supplies the supply voltages to SoC 706 as well as one or more supply voltages to external memory circuit 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory circuit 702 is included as well).

External memory circuit 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multitouch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, computer system 700 may include one or more integrated circuits included within a personal computer, smart phone, tablet computer, or other type of computing device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A system, comprising:

a reference clock configured to track a reference time;

one or more processors; and a memory storing instructions that, when executed on or across the one or more processors, cause the one or more processors to implement a collaborative video system to:

generate a synchronization code for a collaborative video recording session to display;

identify a plurality of recording devices as participants to synchronize with subsequent synchronization signals for the collaborative video recording session according to respective communications received from the plurality of computing responses that individually opt-in the plurality of recording devices using information identifying the collaborative video recording session captured from the synchronization code;

coordinate execution of the collaborative video recording session, comprising:

broadcast one or more synchronization signals to synchronize the plurality of recording devices to the reference time tracked by the reference clock;

receive a plurality of videos from the plurality of recording devices, wherein the plurality of videos comprise timestamps based on synchronization to the reference time; and generate a shared timeline for the plurality of videos, wherein the shared timeline synchronizes the timestamps between the plurality of videos.

2. The system of claim 1, wherein the collaborative video system is further configured to:

wherein the respective communications are respective enrollment requests received from the plurality of recording devices for the collaborative video recording session; and enroll the plurality of recording devices to the collaborative video recording session.

3. The system of claim 2, wherein the collaborative video system is further configured to:

receive an indication that the collaborative video recording session has concluded;

send, to the plurality of recording devices, a request to retrieve additional videos that were recorded during the collaborative video recording session.

4. The system of claim 1, wherein the collaborative video system is further configured to:

receive a request for videos that were recorded at a requested timestamp of the timestamps;

identify videos of the plurality of videos that include at least a portion video data for the requested timestamp; and provide an interface to access the identified videos.

5. The system of claim 1, further comprising:

a display device configured to display the synchronization code, wherein the synchronization code comprises a quick response (QR) code.

6. The system of claim 1, further comprising:

the plurality of recording devices, wherein individual ones of the plurality of recording devices comprise:

a camera configured to:

capture an image of the synchronization code; and record video data;

a network adapter configured to establish communications to the collaborative video recording system; and a location sensor configured to determine a current position and direction of the recording device.

7. A method, comprising:

generating, by a collaborative video system to a plurality of recording devices, a synchronization code for a collaborative video recording session managed by the collaborative video system to display;

identifying a plurality of recording devices as participants to synchronize with subsequent synchronization signals for the collaborative video recording session according to respective communications received from the plurality of computing responses that individually opt-in the plurality of recording devices using information identifying the collaborative video recording session captured from the synchronization code;

coordinating execution of the collaborative video recording session, comprising:

synchronizing the plurality of recording devices to a reference time tracked by a reference clock;

receiving a plurality of videos from the plurality of recording devices, wherein the plurality of videos comprise timestamps based on synchronization to the reference time; and generating a shared timeline for the plurality of videos, wherein the shared timeline synchronizes the timestamps between the plurality of videos.

8. The method of claim 7, further comprising:

wherein the respective communications are respective enrollment requests from the plurality of recording devices for the collaborative video recording session; and enrolling the plurality of recording devices to the collaborative video recording session.

9. The method of claim 8, further comprising:

receiving an indication that the collaborative video recording session has concluded;

sending, to the plurality of recording devices, a request to retrieve additional videos that were recorded during the collaborative video recording session.

10. The method of claim 9, further comprising:

receiving the additional videos; and updating the shared timeline according to the additional videos.

11. The method of claim 7, further comprising:

receiving a request for videos that were recorded at a requested timestamp of the timestamps;

identifying videos of the plurality of videos that include at least a portion video data for the requested timestamp; and providing an interface to access the identified videos.

12. The method of claim 7, wherein providing the synchronization code comprises displaying the synchronization code via a display device of the collaborative video system.

13. The method of claim 7, wherein the synchronization code comprises a quick response (QR) code.

14. One or more non-transitory, computer-readable storage media storing instructions that, when executed on or across one or more processors, cause the one or more processors to:

generate a synchronization code for a collaborative video recording session to display;

identify a plurality of recording devices as participants to synchronize with subsequent synchronization signals for the collaborative video recording session according to respective communications received from the plurality of computing responses that individually opt-in the plurality of recording devices using information identifying the collaborative video recording session captured from the synchronization code;

coordinate execution of the collaborative video recording session, comprising:

synchronize the plurality of recording devices to a reference time tracked by a reference clock; and in response to receipt of a plurality of videos from the plurality of recording devices, generate a shared timeline for the plurality of videos, wherein the plurality of videos comprise timestamps based on synchronization to the reference time, and wherein the shared timeline synchronizes the timestamps between the plurality of videos.

15. The one or more computer-readable storage media of claim 14, further comprising instructions that, when executed on or across one or more processors, cause the one or more processors to:

in response to the respective communications received from the plurality of recording devices for the collaborative video recording session, enroll the plurality of recording devices to the collaborative video recording session.

16. The one or more non-transitory, computer-readable storage media of claim 15, further comprising instructions that, when executed on or across one or more processors, cause the one or more processors to:

in response to an indication that the collaborative video recording session has concluded, send, to the plurality of recording devices, a request to retrieve additional videos that were recorded during the collaborative video recording session.

17. The one or more non-transitory, computer-readable storage media of claim 16, further comprising instructions that, when executed on or across one or more processors, cause the one or more processors to:

in response to receiving the additional videos, update the shared timeline according to the additional videos.

18. The one or more computer-readable storage media of claim 14, further comprising instructions that, when executed on or across one or more processors, cause the one or more processors to:

in response to a request for videos that were recorded at a requested timestamp of the timestamps, identify videos of the plurality of videos that include at least a portion video data for the requested timestamp; and provide an interface to access the identified videos.

19. The one or more non-transitory, computer-readable storage media of claim 14, further comprising instructions that, when executed on or across one or more processors, cause the one or more processors to:

send the synchronization code to a display device of the collaborative video system.

20. The one or more non-transitory, computer-readable storage media of claim 14, wherein the synchronization code comprises a quick response (QR) code.

* * * * *